United States Patent Office 3,452,039
Patented June 24, 1969

3,452,039
CERTAIN 5-TETRAZOLYL BENZOTHIOPHENE COMPOUNDS
Ronald D. Buchanan, Fayetteville, and Richard A. Partyka, Liverpool, N.Y., assignors to Bristol-Myers Company, New York, N.Y., a corporation of Delaware
No Drawing. Filed May 25, 1966, Ser. No. 552,730
Int. Cl. C07d 55/56, 63/10; A61k 27/00
U.S. Cl. 260—308    14 Claims This invention relates to novel compounds. More particularly, this invention relates to novel compounds which possess valuable therapeutic utility as hypocholesterolemic agents and to processes useful in the preparation thereof.

It is an object of this invention to provide a new class of therapeutic compounds. It is another object of this invention to provide novel compounds having hypocholesterolemic activity. It is a further object of the present invention to provide a process for preparing the novel therapeutic compounds.

These and other objects which may appear as the specification proceeds are achieved by this invention which comprises the provision of compounds selected from the group consisting of compounds having the following formula

I

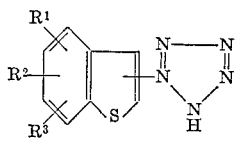

wherein $R^1$, $R^2$ and $R^3$ each represent a member selected from the group consisting of hydrogen, chloro, bromo, fluoro, iodo, trifluoromethyl, (lower)alkyl, (lower)alkoxy, (lower)alkylthio, di(lower)alkylamino, di(lower)alkylamino(lower)alkoxy, nitro, phenyl, phenoxy and benzyl; and the pharmaceutically acceptable nontoxic salts thereof.

The pharmaceutically acceptable nontoxic salts of the compounds of this invention include the nontoxic metallic salts such as sodium, potassium, calcium, aluminum and the like, the ammonium salt and substituted ammonium salts, e.g. salts of such nontoxic amines as trialkylamines, including triethylamine, procaine, dibenzylamine, N-benzyl-β-phenethylamine, 1-ephenamine, N,N'-dibenzylethylenediamine, dehydroabietylamine, N,N'-bisdehydroabietylethylenediamine, N-(lower)alkylpiperidines, e.g. N-ethylpiperidine, morpholine, dimethylamine, methylcyclohexylamine, glucosamine and other amines which have been used to form salts with benzylpenicillin. The salts of the compounds of this invention are prepared by conventional procedures described in the chemical literature.

The term "(lower)alkyl" as used herein means both straight and branched chain aliphatic hydrocarbon radicals having from 1 to 8 carbon atoms, e.g. methyl, ethyl, propyl, isopropyl, butyl, isobutyl, sec.-butyl, t-butyl, amyl, 2-ethylhexyl, octyl, etc.

Similarly, where the term "(lower)" is used as part of the description of another group, e.g., (lower)alkoxy, it refers to the alkyl portion of such group which is therefore as described in connection with (lower)alkyl.

Thus, the compounds of this invention are of the formulae

II

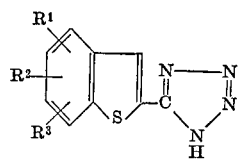

and

III

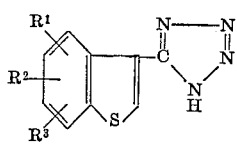

wherein $R^1$, $R^2$ and $R^3$ are as described above, and the pharmaceutically acceptable nontoxic salts thereof.

A preferred group of compounds of the present invention are those of Formula I wherein $R^1$, $R^2$ and $R^3$ each represent a member selected from the group consisting of hydrogen, chloro, bromo, fluoro, iodo, trifluoromethyl, (lower)alkyl, (lower)alkoxy and nitro.

The compounds of this invention have a high degree of hypocholesterolemic activity, making them potent hypocholesterolemic agents, and are useful for lowering serum cholesterol.

Hypocholesterolemic tests of the compounds of the present invention were carried out by administering the compounds (suspended in 0.5% carboxymethylcellulose solution) at a dose of 400 mg./kg. p.o. to rats once daily for 4 days. The control rats were treated similarly with the same volume dose of 0.5% carboxymethylcellulose only. Starting the evening of the fourth day, the rats were fasted. On the fifth day, the serum of the treated rats and control rats was analyzed for cholesterol, and the cholesterol content compared. The result is expressed as the percentage decrease in serum cholesterol.

In the test described above, a preferred compound of the present invention having the formula

IV

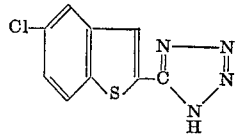

2-(5-tetrazolyl)-5-chlorobenzo[b]thiophene gave a 20% decrease in serum cholesterol at a dosage of 400 mgm./kg. p.o. Thus, this compound is a very potent hypocholesterolemic agent.

The compounds of the present invention also exhibit activity as inhibitors of erythrocyte sedimentation.

The compounds of the present invention corresponding to Formula I are preferably prepared as exemplified below by reacting a nitrile of the formula

V

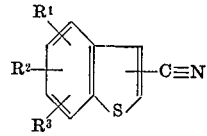

wherein $R^1$, $R^2$ and $R^3$ are as described above, with at least an equimolar weight of an azide and preferably an inorganic azide, e.g. sodium azide, lithium azide, tetramethylammonium azide, trimethylammonium azide, ammonium azide, aluminum azide, morpholinium azide, piperidinium azide or hydrazoic acid, in a liquid (and preferably anhydrous) medium for at least 12 hours at temperatures above room temperature and preferably in the range of about 80° C. to about 140° C. If desired, there may be added as a catalyst a Lewis acid, e.g. boron trifluoride etherate, tetraalkylammonium chlorides, aniline hydrochloride, ammonium chloride, lithium chloride. Suitable liquid media include the monomethyl and ethyl ethers of ethylene and diethylene glycol and tetrahydrofuran, n-butanol and particularly dimethyl sulfoxide and dimethylformamide. The azidic compound may be added per se or prepared in situ. In particular, use may be made of the procedures of United States Patents 2,977,372, 3,155,666, 3,123,615 and those given by McManus et al., J. Org. Chem. 24, 1464 (1959); Finnegan et al., J. Amer. Chem. Soc. 80, 3908–3911 (1958); F. R. Benson, Chem. Rev. 41, 1 (1947); or in E. H. Rodd, Chemistry of Carbon Compounds IV, 481–486, D. H. Van Nostrand Co. Inc., New York, N.Y., (1957); or in the references cited therein for the preparation of 5-substituted tetrazoles.

The 3-cyanobenzo[b]thiophenes of Formula V are well known in the art, or easily prepared in accordance with standard organic procedures previously described in the chemical literature. For example, the 3-cyanobenzo[b]thiophenes may be prepared by the procedure described by M. Martynoff, Compt. Rend. 236, 385 (1953).

The 2-cyanobenbo[b]thiophenes can be conveniently prepared by the following reaction scheme as exemplified below:

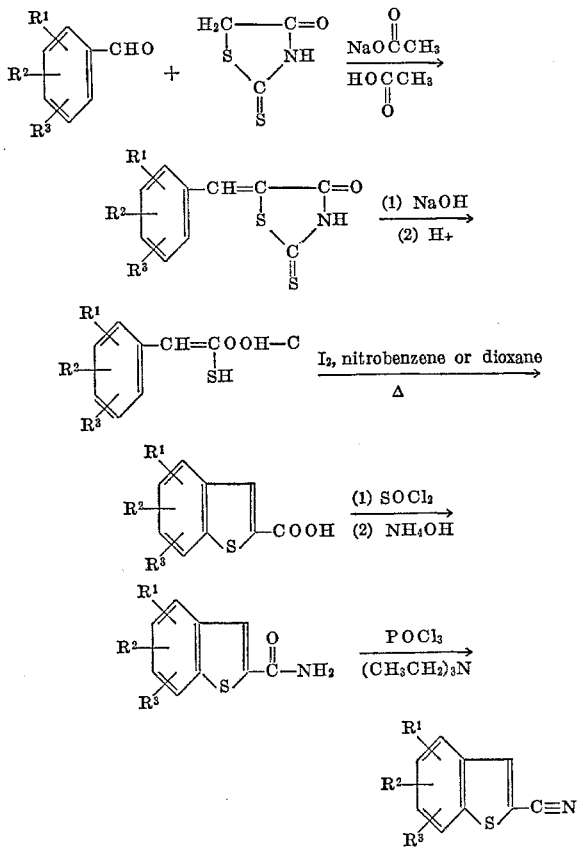

wherein $R^1$, $R^2$ and $R^3$ are as described above. The general process for the preparation of α-mercapto-β-phenylacrylic acids illustrated above is described by Campaigne et al., J. Org. Chem. 21, 32 (1956), and the general process for the preparation of benzo[b]thiophene-2-carboxylic acids illustrated above is described by Campaigne et al., J. Org. Chem. 21, 39 (1956). The preparation of rhodanine is described by Campbell et al., J. Chem. Soc. 1251 (1948).

The compounds of this invention are acidic and may be administered in their free form or in the form of their nontoxic salts. They may be compounded and formulated into pharmaceutical preparations in unit dosage form for oral or parenteral administration with organic or inorganic solid materials or liquids which are pharmaceutically acceptable carriers. The compositions may take the form of tablets, powders, granules, capsules, suspensions, solutions and the like. Such compositions are considered within the scope of this invention.

The compositions of this invention when administered orally or parenterally, in an effective amount, are effective in lowering serum cholesterol.

The following examples are intended to illustrate the invention described herein without unduly restricting it.

(A) PREPARATION OF INTERMEDIATES

Example A–1.—Preparation of 2-cyano-5-cholorobenzo[b]thiophene

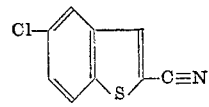

(a) α-mercapto-β-(3-chlorophenyl)acrylic acid. — A mixture of 3-chlorobenzaldehyde (25 g., 0.178 mole), rhodanine (23.7 g., 0.178 mole) and anhydrous sodium acetate (43.5 g., 0.53 mole) in 180 cc. of glacial acetic acid were stirred and heated to near reflux. Within 30 minutes, the mixture had set to a solid yellow mass which was then poured into two liters of water. Filtration and drying afforded 29.1 g. (64%) of 5-(m-chlorobenzylidene)-rhodanine [Campbell et al., J. Chem. Soc. 1251 (1948] (M.P. 228–232° C.). Following Campaigne's method [Campaigne et al., J. Org. Chem. 21, 32 (1956)], this rhodanine derivative (5.0 g., 19.6 mmole) was dissolved in 55 ml. of 10% sodium hydroxide solution and 400 ml. of water. The solution was heated on a steam bath for 20 minutes, cooled in an ice bath, and acidified with cold concentrated hydrochloric acid while stirring vigorously. The light yellow precipitate which separated was filtered immediately, washed with water and recrystallized from aqueous ethanol. The yellow crystals were dried in vacuo over $P_2O_5$ affording 2.6 g. (61.8%) of α-mercapto-β-(3 - chlorophenyl)acrylic acid (M.P. 137.5–139° C.).

Analysis.—Calcd. for $C_9H_7ClO_2S$: C, 50.35%; H, 3.29%; S, 14.94%. Found: C, 50.19%; H, 3.43%; S, 14.81%.

(b) 5-chlorobenzo[b]thiophene-2-carboxylic acid. — Using the method of Campaigne [Campaigne et al., J. Org. Chem. 21, 39 (1956)], iodine (70 g.) was dissolved in 200 ml. of nitrobenzene and heated with stirring to 180–190° C. α-mercapto-β-(3-chlorophenyl)acrylic acid (8.8 g., 41 mmole) was then added rapidly and the mixture was stirred vigorously for one minute. It was then cooled in ice, ether added, and the mixture extracted with 3 portions of 10% sodium hydroxide solution. The alkaline extracts were extracted with ether to remove any residual nitrobenzene and then freed of iodine by adding sodium bisulfite. The latter treatment rendered the mixture sufficiently acidic to precipitate the product acid which was collected and dried (7.3 g., 83.7%). Decolorization in acetonitrile solution and recrystallization from the same solvent afforded 5-chlorobenzo[b]thiophene-2-carboxylic acid, (M.P. 270–275° C.).

Analysis.—Calcd. for $C_9H_5ClO_2S$: C, 50.83%; H, 2.37%; S, 15.08%. Found: C, 50.75%; H, 2.40%; S, 14.89%.

(c) 5 - chlorobenzo[b]thiophene - 2 - carboxamide.— 5-chlorobenzo[b]thiophene-2-carboxylic acid (14.4 g., 67.7 mmole) was refluxed with 50 ml. of thionyl chloride for 1½ hours. The excess thionyl chloride was stripped off under reduced pressure, benzene was added and stripped off and the residual gum was mixed with excess cold ammonium hydroxide solution. The amide separated as a crude brown solid. It was filtered, washed well with water, dissolved and decolorized in ethanol and the ethanol was stripped off to give 13.0 g. of crude product. The solid was then dissolved in methylene chloride and washed with water to remove ammonium chloride. Removal of the methylene chloride and recrystallization from chloroform-"Skellysolve B" (petroleum solvent, B.P. 60–80° C., essentially n-hexane) yielded partially hydrated 5 - chlorobenzo[b]thiophene - 2 - carboxamide (M.P. 168–172° C.). Infrared and N.M.R. spectra were consistent with structure.

(d) 2 - cyano - 5-chlorobenzo[b]thiophene.—5-chlorobenzo[b]thiophene-2-carboxamide (11.9 g., 56.3 mmole) was suspended in 130 ml. of redistilled phosphorus oxychloride and triethylamine (12.15 g., 0.12 mole) was added with swirling. The mixture was refluxed for 2¾ hours, whereupon the excess phosphorus oxychloride was flashed off. To the residue there was added 150 ml. of chloroform and this solution was poured onto 250 g. of ice and the aqueous layer made alkaline with 5% sodium carbonate solution. The layers were separated and the aqueous layer extracted with chloroform. After washing the chloroform extracts and flashing off the solvent there was obtained 11.1 g. of 2-cyano-5-chlorobenzo[b]thiophene as an oil.

Example A–2

When, in the procedure of Example A–1, 3-chlorobenzaldehyde is replaced by an equal molar amount of:

2-chlorobenzaldehyde,
4-chlorobenzaldehyde,
2-trifluoromethylbenzaldehyde,
3-trifluoromethylbenzaldehyde,
4-trifluoromethylbenzaldehyde,
3-bromobenzaldehyde,
2-bromobenzaldehyde,
4-bromobenzaldehyde,
3-fluorobenzaldehyde,
4-fluorobenzaldehyde,
2-iodobenzaldehyde,
3-methoxybenzaldehyde,
4-nitrobenzaldehyde,
4-phenylbenzaldehyde,
2,3-dichlorobenzaldehyde,
3,4-dichlorbenzaldehyde,
3,4,5-trimethoxybenzaldehyde,
3-methylbenzaldehyde,
4-dimethylaminoethoxybenzaldehyde,
2,3,4-trichlorobenzaldehyde,
3-propylbenzaldehyde,
4-benzylbenzaldehyde,
3-diethylaminobenzaldehyde,
4-diethylaminobenzaldehyde,
4-dimethylaminobenzaldehyde,
3-phenoxybenzaldehyde,
2,4-dichlorobenzaldehyde,
4-methoxybenzaldehyde,
2 - trifluoromethyl - 3 - chlorobenzaldehyde and benzaldehyde, There are obtained:

2-cyano-4-chlorobenzo[b]thiophene,
2-cyano-6-chlorobenzo[b]thiophene,
2-cyano-4-trifluoromethylbenzo[b]thiophene,
2-cyano-5-trifluoromethylbenzo[b]thiophene,
2-cyano-6-trifluoromethylbenzo[b]thiophene,
2-cyano-5-bromobenzo[b]thiophene,
2-cyano-4-bromobenzo[b]thiophene,
2-cyano-6-bromobenzo[b]thiophene,
2-cyano-5-fluorobenzo[b]thiophene,
2-cyano-6-fluorobenzo[b]thiophene,
2-cyano-4-iodobenzo[b]thiophene,
2-cyano-5-methoxybenzo[b]thiophene,
2-cyano-6-nitrobenzo[b]thiophene,
2-cyano-6-phenylbenzo[b]thiophene,
2-cyano-4,5-dichlorobenzo[b]thiophene,
2-cyano-5,6-dichlorobenzo[b]thiophene,
2-cyano-5,6,7-trimethoxybenzo[b]thiophene,
2-cyano-5-methylbenzo[b]thiophene,
2-cyano-6-dimethylaminoethoxybenzo[b]thiophene,
2-cyano-4,5,6-trichlorobenzo[b]thiophene,
2-cyano-5-propylbenzo[b]thiophene,
2-cyano-6-benzylbenzo[b]thiophene,
2-cyano-5-diethylaminobenzo[b]thiophene,
2-cyano-6-diethylaminobenzo[b]thiophene,
2-cyano-6-dimethylaminobenzo[b]thiophene,
2-cyano-5-phenoxybenzo[b]thiophene,
2-cyano-4,6-dichlorobenzo[b]thiophene,
2-cyano-6-methoxybenzo[b]thiophene,
2 - cyano - 4-trifluoromethyl-5-chlorobenzo[b]thiophene and
2-cyano-benzo[b]thiophene, respectively.

B. PREPARATION OF PRODUCTS

Example B–1.—Preparation of 2-(5-tetrazoyly)-5-chlorobenzo[b]thiophene

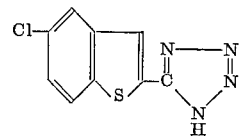

A mixture of crude 2-cyano-5-chloro[b]thiophene (11.1 g., 57.4 mmole), sodium azide (3.9 g., 60 mmole) and ammonium chloride (3.21 g., 60 mmole) in 100 ml. of dry dimethylformamide was stirred and heated at 90–105° C. for 16 hours. The bulk of the dimethylformamide was stripped off and the residue was treated with 150 ml. of water and acidified with 6 N hydrochloric acid. The resultant brown solid was extracted into ether and the ether extracts were then extracted with saturated sodium bicarbonate solution. The dark bicarbonate solution was decolorized, acidified with concentrated hydrochloric acid and the solid which separated was extracted into ether. The ether extracts were dried over anhydrous $MgSO_4$ and the ether was removed, yielding 4.6 g. (34.5%) of 2-(5-tetrazolyl)-5-chlorobenzo[b]thiophene. Recrystallization from ethyl acetate-"Skellysolve B" and then from benzene-ethanol afforded an analytical sample of the hemihydrate (M.P. 204–208° C. dec.).

*Analysis.*—Calcd. for $C_9H_5ClN_4S \cdot \frac{1}{2}H_2O$: C, 43.99%; H, 2.46%; N, 22.81%; S, 13.05%. Found: C, 44.13%; H, 2.53%; N, 23.10%; S, 13.07%.

Example B–2

When, in the procedure of Example B–1, 2-cyano-5-chlorobenzo[b]thiophene is replaced by an equal molar amount of each of the products of Example A–2, there are obtained:

2-(5-tetrazolyl)-4-chlorobenzene[b]thiophene,
2-(5-tetrazolyl)-6-chlorobenzo[b]thiophene,
2-(5-tetrazolyl)-4-trifluoromethylbenzo[b]thiophene,
2-(5-tetrazolyl)-5-trifluoromethylbenzo[b]thiophene,
2-(5-tetrazolyl)-6-trifluoromethylbenzo[b]thiophene,
2-(5-tetrazolyl)-5-bromobenzo[b]thiophene,
2-(5-tetrazolyl)-6-bromobenzo[b]thiophene,
2-(5-tetrazolyl)-5-fluorobenzo[b]thiophene,
2-(5-tetrazolyl)-6-fluorobenzo[b]thiophene,
2-(5-tetrazolyl)-4-iodobenzo[b]thiophene,
2-(5-tetrazolyl)-5-methoxybenzo[b]thiophene,
2-(5-tetrazolyl)-6-nitrobenzo[b]thiophene,
2-(5-tetrazolyl)-6-phenylbenzo[b]thiophene,
2-(5-tetrazolyl)-4,5-dichlorobenzo[b]thiophene,
2-(5-tetrazolyl)-5,6-dichlorobenzo[b]thiophene,
2-(5-tetrazolyl)-5,6,7-trimethoxybenzo[b]thiophene,
2-(5-tetrazolyl)-5-methylbenzo[b]thiophene, 2-(5-tetrazolyl)-6-dimethylaminoethoxybenzo[b]
 thiophene,
2-(5-tetrazolyl)-4,5,6-trichlorobenzo[b]thiophene,
2-(5-tetrazolyl)-5-propylbenzo[b]thiophene,
2-(5-tetrazolyl)-6-benzylbenzo[b]thiophene,
2-(5-tetrazolyl)-5-dimethylaminobenzo[b]thiophene,
2-(5-tetrazolyl)-6-diehylaminobenzo[b]thiophene,
2-(5-tetrazolyl)-6-dimethylaminobenzo[b]thiophene,
2-(5-tetrazolyl)-5-phenoxybenzo[b]thiophene,
2-(5-tetrazolyl)-4,6-dichlorobenzo[b]thiophene,
2-(5-tetrazolyl)-6-methoxybenzo[b]thiophene,
2-(5-tetrazolyl)-4-trifluoromethyl-5-chlorobenzo[b]
 thiophene, and
2-(5-tetrazolyl)-benzo[b]thiophene,
respectively.

Example B-3

When, in the procedure of Example B-1, 2-cyano-5-chlorobenzo[b]thiophene is replaced by an equal molar amount of:

3-cyano-5-chlorobenzo[b]thiophene,
3-cyano-4-chlorobenzo[b]thiophene,
3-cyano-6-chlorobenzo[b]thiophene,
3-cyano-4-trifluoromethylbenzo[b]thiophene,
3-cyano-5-trifluoromethylbenzo[b]thiophene,
3-cyano-6-trifluoromethylbenzo[b]thiophene,
3-cyano-5-bromobenzo[b]thiophene,
3-cyano-4-bromobenzo[b]thiophene,
3-cyano-6-bromobenzo[b]thiophene,
3-cyano-5-fluorobenzo[b]thiophene,
3-cyano-6-fluorobenzo[b]thiophene,
3-cyano-4-iodobenzo[b]thiophene,
3-cyano-5-methoxybenzo[b]thiophene,
3-cyano-6-nitrobenzo[b]thiophene,
3-cyano-6-phenylbenzo[b]thiophene,
3-cyano-4,5-dichlorobenzo[b]thiophene,
3-cyano-5,6-dichlorobenzo[b]thiophene,
3-cyano-5,6,7-trimethoxybenzo[b]thiophene,
3-cyano-5-methylbenzo[b]thiophene,
3-cyano-6-dimethylaminoethoxybenzo[b]thiophene,
3-cyano-4,5,6-trichlorobenzo[b]thiophene,
3-cyano-5-propylbenzo[b]thiophene,
3-cyano-6-benzylbenzo[b]thiophene,
3-cyano-5-diethylaminobenzo[b]thiophene,
3-cyano-6-diethylaminobenzo[b]thiophene,
3-cyano-6-dimethylaminobenzo[b]thiophene,
3-cyano-5-phenoxybenzo[b]thiophene,
3-cyano-4,6-dichlorobenzo[b]thiophene,
3-cyano-6-methoxybenzo[b]thiophene,
3-cyano-4-trifluoromethyl-5-chlorobenzo[b]thiophene,
 and
3-cyano-benzo[b]thiophene.

There are obtained:

3-(5-tetrazolyl)-5-chlorobenzo[b]thiophene,
3-(5-tetrazolyl)-4-chlorobenzo[b]thiophene,
3-(5-tetrazolyl)-6-chlorobenzo[b]thiophene,
3-(5-tetrazolyl)-4-trifluoromethylbenzo[b]thiophene,
3-(5-tetrazolyl)-5-trifluoromethylbenzo[b]thiophene,
3-(5-tetrazolyl)-6-trifluoromethylbenzo[b]thiophene,
3-(5-tetrazolyl)-5-bromobenzo[b]thiophene,
3-(5-tetrazolyl)-4-bromobenzo[b]thiophene,
3-(5-tetrazolyl)-6-bromobenzo[b]thiophene,
3-(5-tetrazolyl)-5-fluorobenzo[b]thiophene,
3-(5-tetrazolyl)-6-fluorobenzo[b]thiophene,
3-(5-tetrazolyl)-4-iodobenzo[b]thiophene,
3-(5-tetrazolyl)-5-methoxybenzo[b]thiophene,
3-(5-tetrazolyl)-6-nitrobenzo[b]thiophene,
3-(5-tetrazolyl)-6-phenylbenzo[b]thiophene,
3-(5-tetrazolyl)-4,5-dichlorobenzo[b]thiophene,
3-(5-tetrazolyl)-5,6-dichlorobenzo[b]thiophene,
3-(5-tetrazolyl)-5,6,7-trimethoxybenzo[b]thiophene,
3-(5-tetrazolyl)-5-methylbenzo[b]thiophene,
3-(5-tetrazolyl)-6-dimethylaminoethoxybenzo[b]
 thiophene,
3-(5-tetrazolyl)-4,5,6-trichlorobenzo[b]thiophene,
3-(5-tetrazolyl)-5-propylbenzo[b]thiophene,
3-(5-tetrazolyl)-6-benzylbenzo[b]thiophene,
3-(5-tetrazolyl)-5-diethylaminobenzo[b]thiophene,
3-(5-tetrazoly)-6-diethylaminobenzo[b]thiophene,
3-(5-tetrazolyl)-6-dimethylaminobenzo[b]thiophene,
3-(5-tetrazolyl)-5-phenoxybenzo[b]thiophene,
3-(5-tetrazolyl)-4,6-dichlorobenzo[b]thiophene,
3-(5-tetrazolyl)-6-methoxybenzo[b]thiophene,
3-(5-tetrazolyl)-4-trifluoromethyl-5-chlorobenzo[b]
 thiophene, and
3-(5-tetrazolyl)-benzo[b]thiophene,
respectively.

While the foregoing invention has been described and exemplified in terms of its preferred embodiment, those skilled in the art will appreciate that modifications can be made without departing from the spirit and scope of this invention.

What is claimed is:

1. A compound selected from the group consisting of compounds of the formula

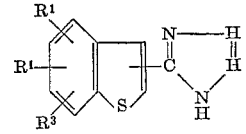

wherein $R^1$, $R^2$ and $R^3$ each represent a member selected from the group consisting of hydrogen, chloro, bromo, fluoro, iodo, trifluoromethyl, (lower)alkyl, (lower)alkoxy, (lower)alkylthio, di(lower)alkylamino, di(lower)alkylamino(lower)alkoxy, nitro, phenyl, phenoxy and benzyl; and the pharmaceutically acceptable nontoxic salts thereof.

2. A compound of claim 1 having the formula

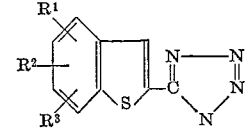

wherein $R^1$, $R^2$ and $R^3$ each represent a member selected from the group consisting of hydrogen, chloro, bromo, fluoro, iodo, trifluoromethyl (lower)alkyl, (lower)alkoxy, (lower)alkylthio, di(lower)alkylamino, di(lower)alkylamino(lower)-alkoxy, nitro, phenyl, phenoxy and benzyl; and the pharmaceutically acceptable nontoxic salts thereof.

3. A compound of claim 1 having the formula

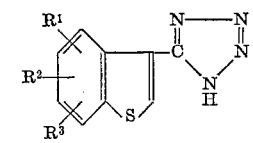

wherein $R^1$, $R^2$ and $R^3$ each represent a mmeber selected from the group consisting of hydrogen, chloro, bromo, fluoro, iodo, trifluoromethyl, (lower)alkyl, (lower)alkoxy, (lower)alkylthio, di(lower)alkylamino, di(lower)alkylamino(lower)-alkoxy, nitro, phenyl, phenoxy and benzyl; and the pharmaceutically acceptable nontoxic salts thereof.

4. A compound of claim 1 having the formula

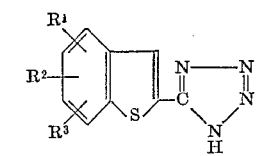

wherein $R^1$, $R^2$ and $R^3$ each represent a member selected from the group consisting of hydrogen, chloro, bromo, fluoro, iodo, trifluoromethyl, (lower)alkyl, (lower)alkoxy and nitro.

5. The compound of claim 1 having the formula

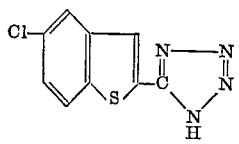

6. A pharmaceutically acceptable nontoxic salt of the compound of claim 5.

7. The compound of claim 1 having the formula

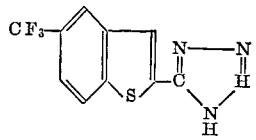

8. The compound of claim 1 having the formula

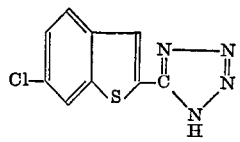

9. The compound of claim 1 having the formula

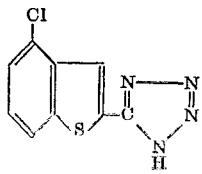

10. The compound of claim 1 having the formula

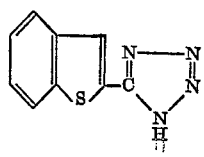

11. The compound of claim 1 having the formula

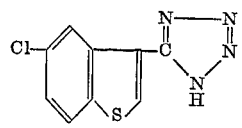

12. The compound of claim 1 having the formula

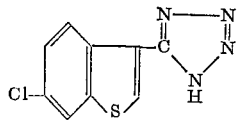

13. The compound of claim 1 having the formula

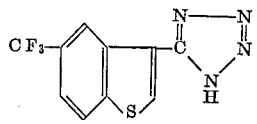

14. The compound of claim 1 having the formula

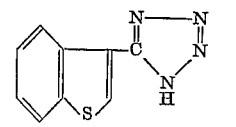

References Cited

UNITED STATES PATENTS 3,337,576   8/1967   Buchanan et al. _____ 260—308

ALTON D. ROLLINS, *Primary Examiner.*

U.S. Cl. X.R.

260—299, 516, 330.5, 306.7, 599, 293.4, 247.1, 269, 267, 248, 245

PO-1050
(5/69)

UNITED STATES PATENT OFFICE
CERTIFICATE OF CORRECTION

Patent No. 3,452,039  Dated June 24, 1969

Inventor(s) Ronald L. Buchanan and Richard A. Partyka

It is certified that error appears in the above-identified patent and that said Letters Patent are hereby corrected as shown below:

Column 1, line 4, "Ronald D. Buchanan" should read "Ronald L. Buchanan".

SIGNED AND
SEALED

DEC 2 - 1969

(SEAL)
Attest:

Edward M. Fletcher, Jr.
Attesting Officer

WILLIAM E. SCHUYLER, JR.
Commissioner of Patents